US012700256B2

(12) United States Patent
Nakashima et al.

(10) Patent No.: US 12,700,256 B2
(45) Date of Patent: Aug. 4, 2026

(54) TERMINAL DEVICE

(71) Applicant: SHARP KABUSHIKI KAISHA, Sakai City (JP)

(72) Inventors: Ken Nakashima, Sakai City (JP); Yoshitomo Akagi, Sakai City (JP); Masaki Tabata, Sakai City (JP); Shunsuke Ogawa, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 275 days.

(21) Appl. No.: 18/714,968

(22) PCT Filed: Dec. 21, 2022

(86) PCT No.: PCT/JP2022/047032
§ 371 (c)(1),
(2) Date: May 30, 2024

(87) PCT Pub. No.: WO2023/127623
PCT Pub. Date: Jul. 6, 2023

(65) Prior Publication Data
US 2026/0154985 A1 Jun. 4, 2026

(30) Foreign Application Priority Data

Dec. 28, 2021 (JP) ................................. 2021-214730

(51) Int. Cl.
*G06V 40/16* (2022.01)
*G06T 7/62* (2017.01)
(Continued)

(52) U.S. Cl.
CPC .............. *G06V 40/161* (2022.01); *G06T 7/62* (2017.01); *G06T 7/70* (2017.01); *G06V 40/67* (2022.01); *G06T 2207/30201* (2013.01)

(58) Field of Classification Search
CPC ........ G06V 40/161; G06V 40/67; G06T 7/62; G06T 7/70; G06T 2207/30201
See application file for complete search history.

(56) References Cited

U.S. PATENT DOCUMENTS

2012/0200729 A1 8/2012 Hoda et al.
2020/0045238 A1 * 2/2020 Baig ................... G06F 3/04845
(Continued)

FOREIGN PATENT DOCUMENTS

JP 2010-258613 A 11/2010
JP 2012-165174 A 8/2012
JP 2021183079 A * 12/2021

*Primary Examiner* — Han Hoang
(74) *Attorney, Agent, or Firm* — ScienBiziP, P.C.

(57) ABSTRACT

Provided is a terminal device that can easily photograph a measurement subject and measure bioinformation for the measurement subject. A terminal device comprises an information acquisition unit that acquires an image of a measurement subject captured by a photography unit, a slope detection unit that detects the slope of the face of the measurement subject on the screen of a display unit on the basis of a facial image of the measurement subject included in the image captured by the photography unit, and a display control unit that displays a first indicator image that has been matched to the slope of the face detected by the slope detection unit on top of an image displayed at the screen of the display unit that includes the measurement subject.

14 Claims, 11 Drawing Sheets

P301       P302       P303       P304

(51) Int. Cl.
    *G06T 7/70*           (2017.01)
    *G06V 40/60*        (2022.01)

(56)                References Cited

U.S. PATENT DOCUMENTS

| | | | |
|---|---|---|---|
| 2020/0293752 A1* | 9/2020 | Lin | H04N 23/611 |
| 2022/0012825 A1* | 1/2022 | Yahata | G06Q 30/0635 |
| 2025/0131648 A1* | 4/2025 | Chen | G06T 7/50 |

* cited by examiner

| Now measuring | ~61 |
| | ~51 |

| Body temperature | 36.3°C | ~62 |
| Blood pressure | – |
| Pulse rate | – |
| Respiratory rate | – |

| Measurement finished | ~61 |

| Body temperature | 36.3°C | ~62 |
| Blood pressure | 130/81 |
| Pulse rate | 84/min |
| Respiratory rate | 16/min |

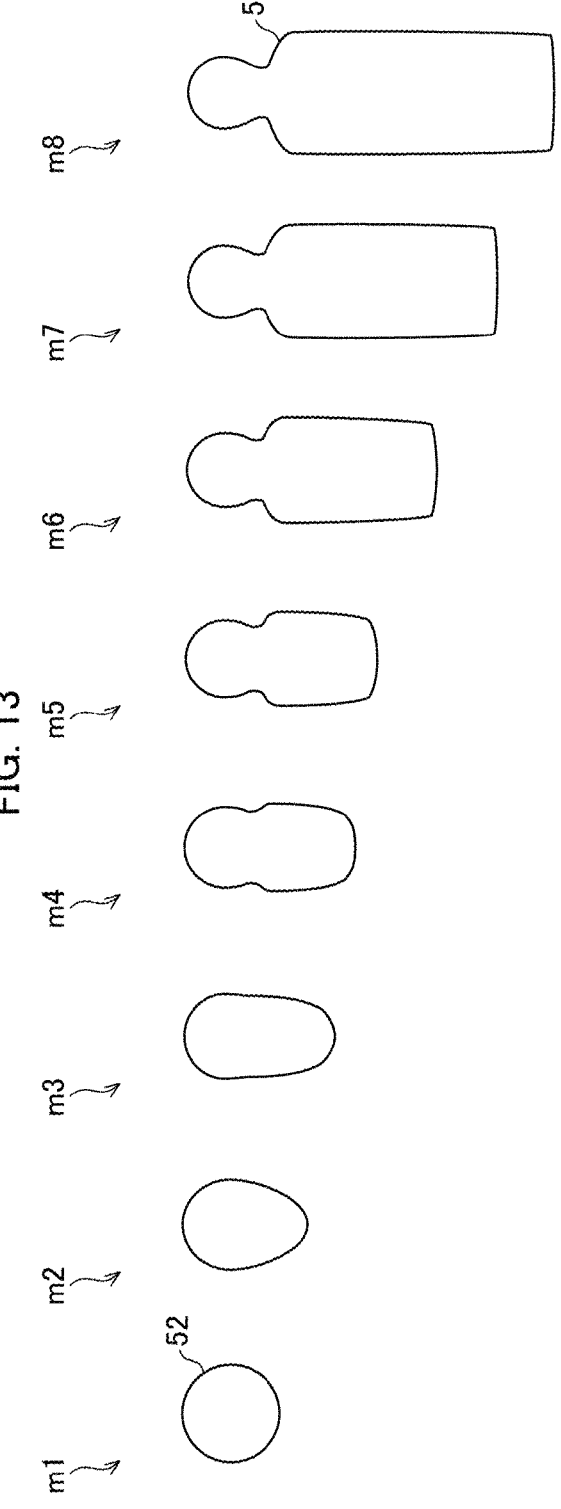

TERMINAL DEVICE

TECHNICAL FIELD

The present invention relates to a terminal device that measures biological information of a measurement subject in a non-contact manner.

BACKGROUND ART

Conventionally, there is known a technique of displaying an indicator image on top of an image of a photography subject. For example, Patent Literature 1 discloses a movie processing system that combines a captured movie of a user and a contour line (indicator image) of a model actor in a model movie as a display movie and displays the display movie. In addition, Patent Literature 2 discloses an image display control device that generates a face display frame (indicator image) surrounding a face area of a subject and a human body display frame (indicator image) surrounding a human body area of the subject, and displays the display frames in a screen together with an image obtained as a result of photographing the subject.

Furthermore, the technology as described above can be applied in particular to a terminal device that measures biological information of a measurement subject on the basis of a photographed image of the measurement subject (photography subject). In such a terminal device that measures biological information, it is important to continue to photograph an image of the measurement subject at a predetermined measurement position in a screen of a display unit. Therefore, the terminal device displays an indicator image (face position guide, human-shaped contour guide, and the like) indicating a measurement position in the screen of the display unit with the indicator image being displayed on top of an image including the measurement subject.

CITATION LIST

Patent Literature

Patent Literature 1: JP 2010-258613 A
Patent Literature 2: JP 2012-165174 A

SUMMARY OF INVENTION

Technical Problem

However, in the technology as described above, the indicator image is fixed in the screen of the display unit. Therefore, for example, when a measurer who operates the terminal device photographs a measurement subject in a lying state, the measurer needs to rotate the terminal device so that the measurement subject in the lying state matches the indicator image. Therefore, there is a concern that the measurer feels troublesome, or unintentionally moves the terminal device and fails the measurement.

An aspect of the present invention has been made in view of the above problem, and an object of the present invention is to provide a terminal device that can easily photograph a measurement subject and measure biological information for the measurement subject.

Solution to Problem

In order to solve the above problem, a terminal device according to one aspect of the present invention includes: a photography unit; a display unit; an information acquisition unit configured to acquire an image of a measurement subject photographed by the photography unit as information for measuring biological information of the measurement subject; a slope detection unit configured to detect a slope of a face of the measurement subject in a screen of the display unit based on a face image of the measurement subject included in the image photographed by the photography unit; and a display control unit configured to cause a first indicator image to be displayed on top of the image including the measurement subject displayed in the screen of the display unit, the first indicator image corresponding to the slope of the face detected by the slope detection unit.

Advantageous Effects of Invention

According to an aspect of the present invention, it is possible to provide a terminal device that can easily photograph a measurement subject and measure biological information for the measurement subject.

BRIEF DESCRIPTION OF DRAWINGS

FIG. 6 is a view showing another example of the image displayed by the terminal device when the face position of the measurement subject in the screen of the display unit is displaced within a predetermined range.

FIG. 7 is a view showing an image displayed by the terminal device when a size of a face of the measurement subject in the screen of the display unit becomes smaller than a predetermined threshold.

FIG. 12 is a view showing an image displayed by the terminal device on the basis of completion of measurement of biological information of the measurement subject.

FIG. 13 is a diagram illustrating a state in which a second indicator image gradually changes to a first indicator image.

DESCRIPTION OF EMBODIMENTS

First Embodiment

1. Schematic Configuration of Terminal Device 100

Figure 1:
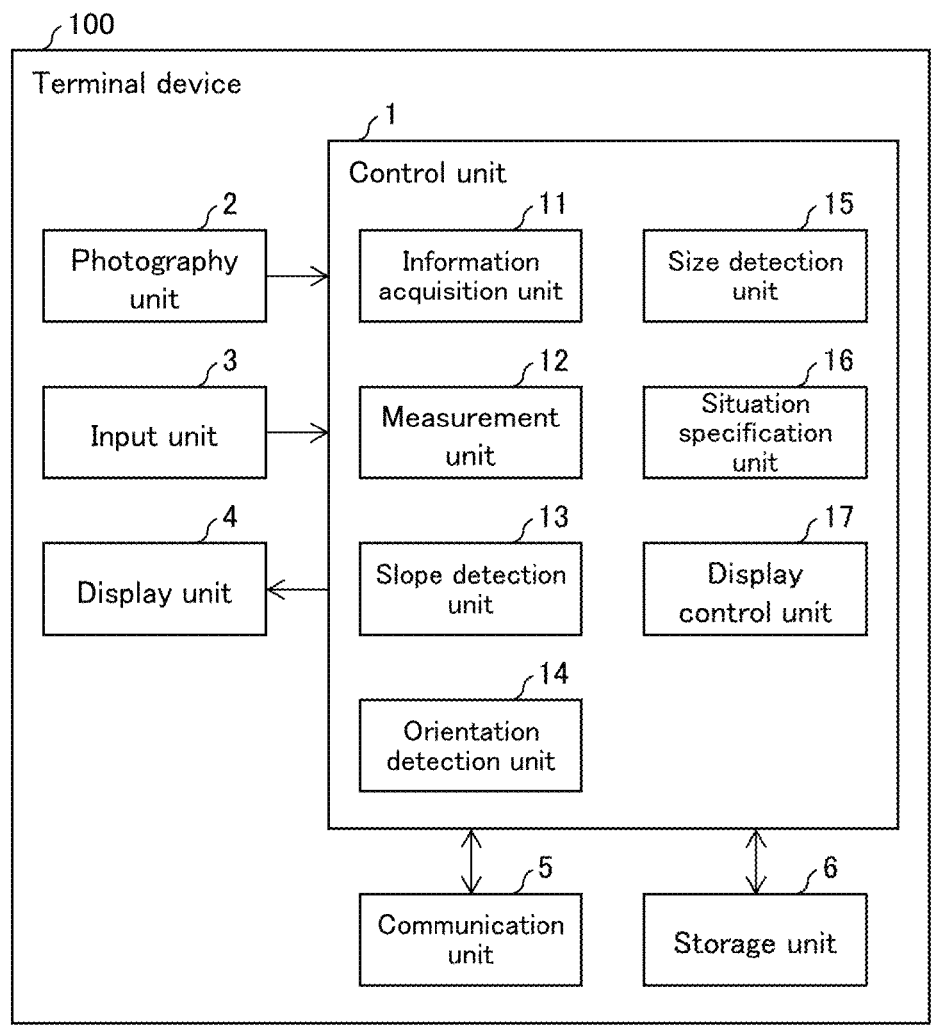
FIG. 1 is a block diagram illustrating a schematic configuration of a terminal device according to an embodiment of the present invention.

FIG. 1 is a block diagram illustrating a schematic configuration of a terminal device according to this embodiment. As illustrated in FIG. 1, a terminal device 100 includes a control unit 1, a photography unit 2, an input unit 3, a display unit 4, a communication unit 5, and a storage unit 6. The terminal device 100 is a device used to measure biological information of a measurement subject based on a photographed image of the measurement subject (that is, in a non-contact manner). Examples of items of the biological information include, but are not limited to, a body temperature, a blood pressure, a pulse rate, a respiratory rate, and the like of the measurement subject. The terminal device 100 needs to have an image acquisition function and an image display function, and may be a smartphone or a tablet terminal, for example.

A measurer measures the biological information of the measurement subject using the terminal device 100 by continuously photographing the measurement subject while confirming the image including the measurement subject displayed in a screen of the display unit 4. The terminal device 100 as described above is used, for example, when a caregiver (measurer) measures biological information of a care receiver (measurement subject) at a care site.

Note that a function of the terminal device 100 described below can also be realized by installing a program in a general-purpose computer. The program can also be referred to as application software. Hereinafter, an example in which the terminal device 100 is a smartphone in which the program is installed will be described.

The control unit 1 integrally controls the units of the terminal device 100. The photography unit 2 photographs an image. The input unit 3 receives an input operation to the terminal device 100. The display unit 4 has a screen, and displays an image photographed by the photography unit 2 in the screen. The communication unit 5 transmits and receives various data between an external communication device and the control unit 1. The storage unit 6 stores various data handled by the terminal device 100. The input unit 3 may be a touch panel, and in this case, the input unit 3 is configured integrally with the display unit 4.

The control unit 1 includes an information acquisition unit 11, a measurement unit 12, a slope detection unit 13, an orientation detection unit 14, a size detection unit 15, a situation specification unit 16, and a display control unit 17.

The information acquisition unit 11 acquires an image of the measurement subject photographed by the photography unit 2 (hereinafter, referred to as a photographed image) as information for measuring biological information of the measurement subject. The photographed image may be a movie of the measurement subject or a still image of the measurement subject.

The measurement unit 12 measures the biological information of the measurement subject based on the photographed image. Here, an external server may measure the biological information of the measurement subject instead of the measurement unit 12. In this case, the photographed image acquired by the information acquisition unit 11 is transmitted to the external server via the communication unit 5.

The slope detection unit 13 detects a slope of a face of the measurement subject in the screen of the display unit 4 based on a face image of the measurement subject included in the photographed image acquired by the information acquisition unit 11 (hereinafter, simply referred to as the face image). The slope of the face is calculated from the center line of the face. The center line is, for example, a straight line connecting the center of a nose and the center of a mouth, or a straight line connecting the centers of right and left eyes. The orientation detection unit 14 detects whether the face of the measurement subject turns sideways in the screen of the display unit 4 based on the face image. The size detection unit 15 detects a size of the face of the measurement subject in the screen of the display unit 4 based on the face image.

Note that the "slope of the face" of the measurement subject in the screen of the display unit 4 refers to an angle formed between the center line of the face and a predetermined direction serving as a reference in the screen, for example, a vertical direction parallel to a vertical side or a horizontal direction parallel to a horizontal side of the display screen.

The situation specification unit 16 specifies a situation related to measurement. The situation specification unit 16 specifies an unmeasurable item among predetermined items of biological information to be measured on the basis of a photographed image of the measurement subject. In addition, the situation specification unit 16 specifies that the measurement of the biological information has failed, that the measurement of the biological information has been completed, and the like.

The display control unit 17 displays the photographed image in the screen of the display unit 4. Hereinafter, an image including the measurement subject displayed in the screen is referred to as a display image. The display control unit 17 displays a first indicator image 51 for causing the measurer to continuously perform photographing so as not to change a face position of the measurement subject on top of the display image (see FIGS. 2 to 9). The first indicator image 51 is an image according to the slope of the face detected by the slope detection unit 13.

The first indicator image 51 may be a human-shaped contour guide of a human shape including a face portion and a shoulder portion. Here, the first indicator image 51 may be generated by rotating a contour guide selected from a plurality of human-shaped contour guides stored in advance in the storage unit 6 based on the slope of the face detected by the slope detection unit 13. Alternatively, the first indicator image 51 may be generated by extracting the contours of the face and a shoulder of the measurement subject included in the photographed image.

Figure 2:
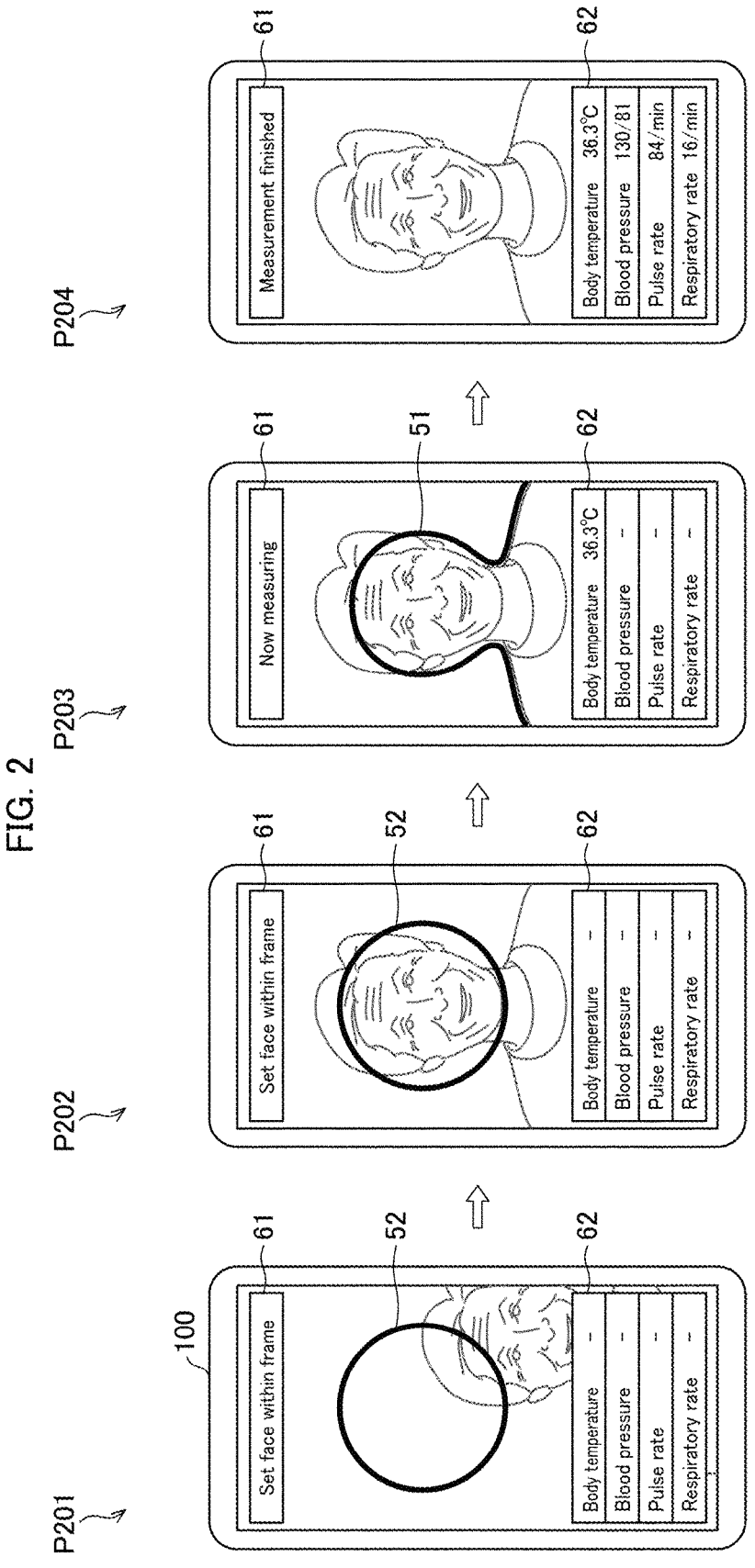
FIG. 2 is a view showing an example of an image displayed by the terminal device at the time of measurement of a measurement subject in a seated state or a standing state.
Figure 3:
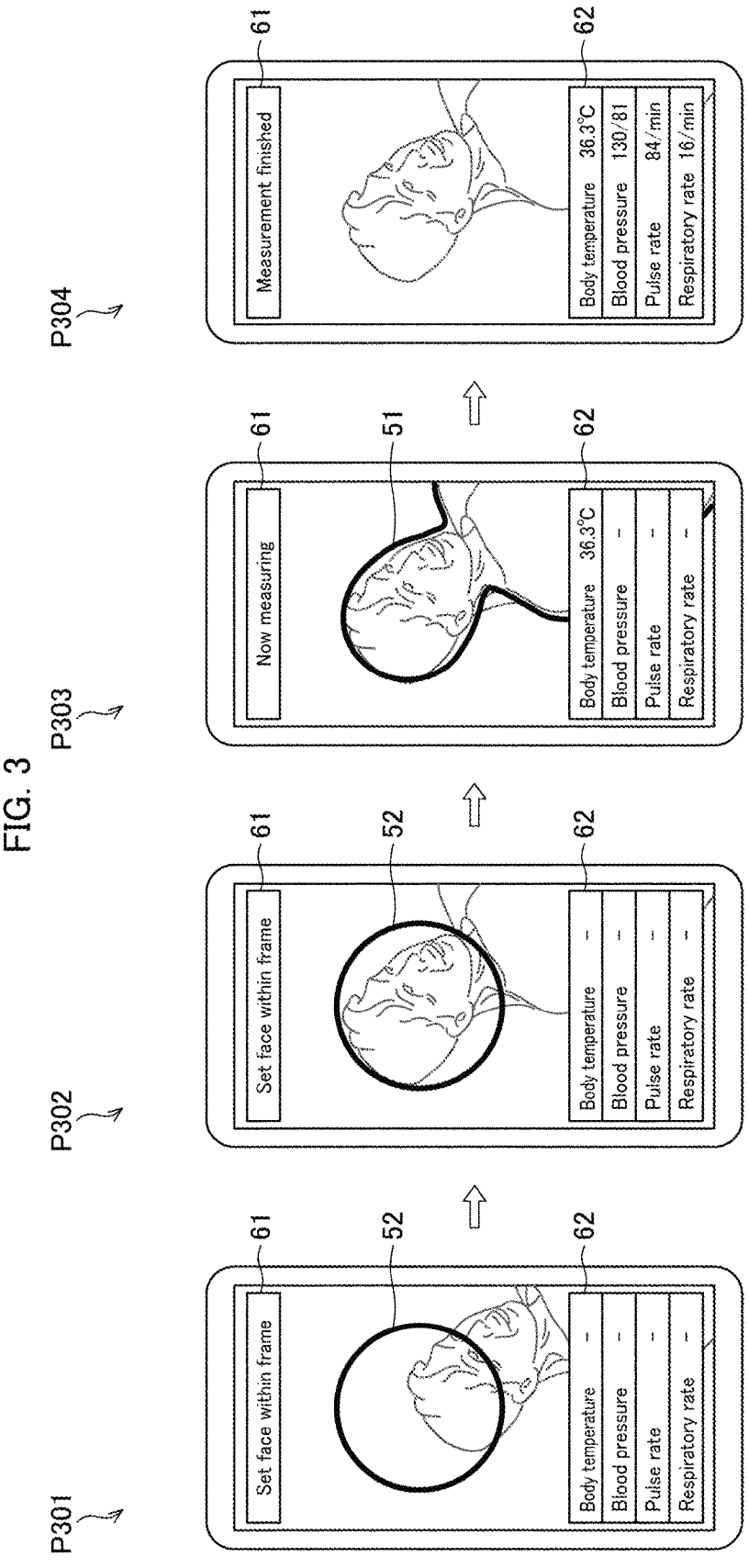
FIG. 3 is a view showing an example of an image displayed by the terminal device at the time of measurement of a measurement subject in a lying state.
Figure 9:
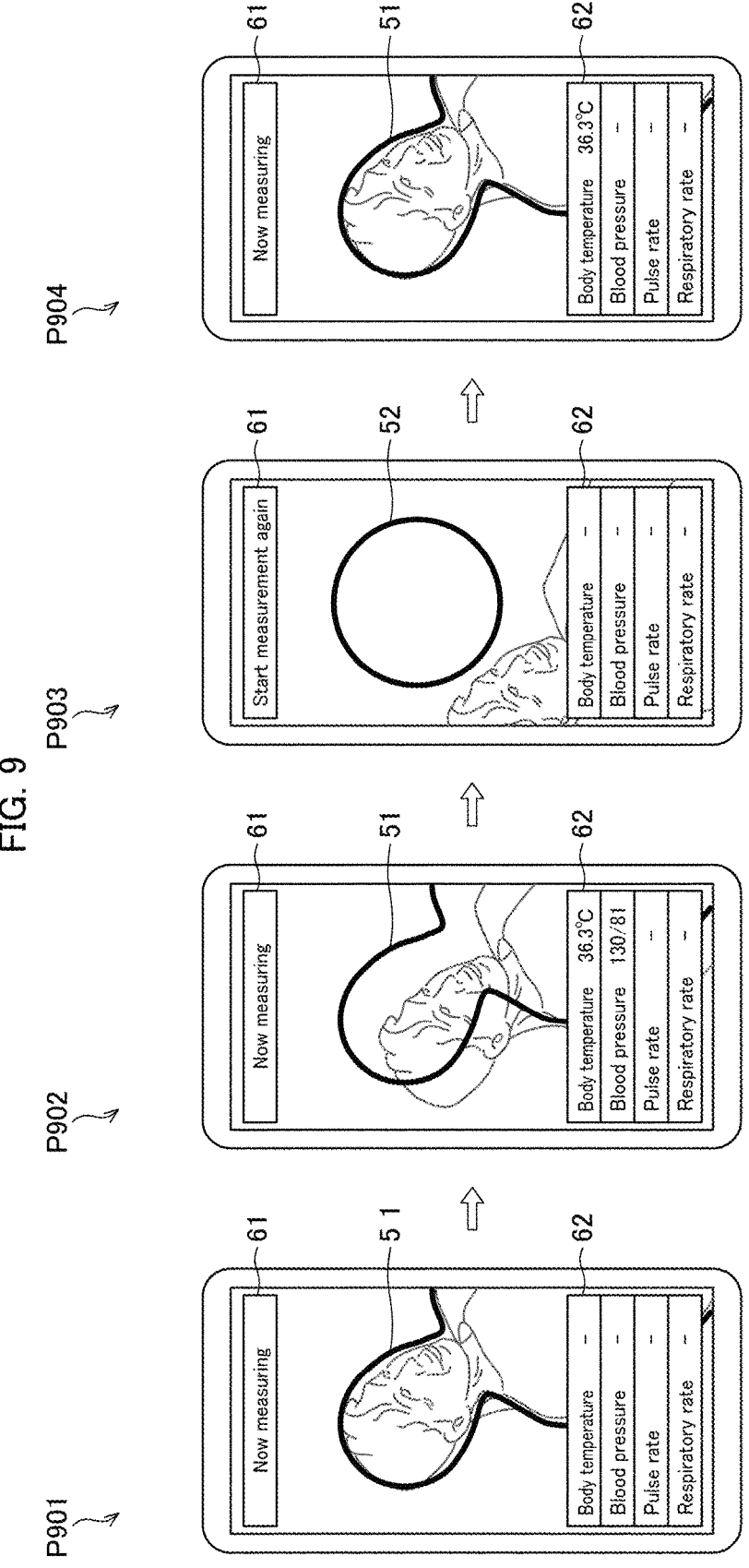
FIG. 9 is a view showing another example of the image displayed by the terminal device when a failure of measurement is specified by the situation specification unit.

In addition, the display control unit 17 may display a second indicator image 52 on top of the display image before the measurement by the measurement unit 12 is started (see FIGS. 2, 3, and 9). The second indicator image 52 is an image for causing the measurer to adjust the face position of the measurement subject to a predetermined position in the screen of the display unit 4. In this case, after starting the measurement, the display control unit 17 displays the first indicator image 51, which is the human-shaped contour guide of a human shaped including the face portion and the shoulder portion, on top of the display image.

The second indicator image 52 may be a frame-shaped guide that encloses the face of the measurement subject displayed in the screen within the frame-shaped guide. The size of the frame-shaped guide is such that a distance between the measurement subject and the terminal device 100 becomes an appropriate distance (for example, 50~60 cm) corresponding to the performance of the photography unit 2 by the measurer photographing the face of the measurement subject with the approximately same size as the frame-shaped guide. The measurer can measure the biological information of the measurement subject by setting the distance between the measurement subject and the terminal device 100 to an appropriate distance. Note that the second indicator image 52 may have a shape indicating the position of the center of the face of the measurement subject when the face of the measurement subject is aligned with a predetermined position in the screen of the display unit 4 (for example, a cross mark), or a shape indicating the position of eyes, nose, mouth, ears, or the like.

The frame-shaped guide may have an isotropic shape. Here, examples of the isotropic shape include, but not limited to, a circle, a regular polygon, and a sphere.

In addition, the display control unit 17 may display a notification image 61 indicating notification information related to the measurement to the measurer on top of the display image on the basis of the situation related to the measurement specified by the situation specification unit 16 (see FIGS. 2 to 9). The display control unit 17 may further display biological information items to be measured by the measurement unit 12 and a measurement result image 62 indicating the measurement result on top of the display image (see FIGS. 2, 3, 8, and 9).

Note that instead of the display control unit 17 displaying the notification image 61, a speaker provided in the terminal device 100 may output notification information related to the measurement to the measurer by voice. Similarly, instead of the display control unit 17 displaying the measurement result image 62, the speaker provided in the terminal device 100 may output items of the biological information to be measured and a measurement result by voice.

2. Method for Displaying First Indicator Image 51 and Second Indicator Image 52

Next, a detailed display method of the first indicator image 51 and the second indicator image 52 by the display control unit 17 will be described below with reference to FIGS. 2 to 9. In the example illustrated in FIGS. 2 to 9, the second indicator image 52 is a circular frame-shaped guide having an isotropic shape, and the first indicator image 51 is a human-shaped contour guide.

In the example illustrated in FIGS. 2 to 9, the display control unit 17 displays the notification image 61 in an upper part of the screen of the display unit 4 and the measurement result image 62 in a lower part of the screen of the display unit 4 while the display image is displayed. However, the positions and the timing at which the display control unit 17 displays the notification image 61 and the measurement result image 62 are not limited to this example. For example, the notification image 61 and the measurement result image 62 may be displayed on the left and right portions of the screen of the display unit 4. The measurement result image 62 may be displayed after the measurement is completed. For convenience, the measurement result image 62 is not illustrated in FIGS. 4 to 7.

FIG. 2 is a view showing an example of an image displayed by the terminal device at the time of measurement of a measurement subject in a seated state or a standing state. FIG. 2 shows an example of display images P201 to P204 displayed by the display control unit 17 in order to make the measurer aware that the measurement subject in the seated state is appropriately photographed.

The display image P201 indicates an image displayed by the display control unit 17 at the start of photographing. Here, the display control unit 17 displays the second indicator image 52 at a predetermined position in the screen of the display unit 4. Examples of the predetermined position include substantially the center of an area excluding the notification image 61 and the measurement result image 62 in the screen of the display unit 4. In addition, the display control unit 17 displays, in the notification image 61, the notification information indicating that the face of the measurement subject is to be enclosed within the frame of the second indicator image 52 (a phrase "Set the face within the frame").

In addition, the display control unit 17 displays a list of items of biological information ("body temperature", "blood pressure", "pulse", and "respiration") to be measured in the measurement result image 62. The result display field in the measurement result image 62 is blank until the measurement is completed. The measurer checks the display image P201 as described above and adjusts a photographing region by moving the terminal device 100 such that the face of the measurement subject is enclosed in the frame of the second indicator image 52.

The display image P202 indicates a state in which the face of the measurement subject is enclosed within the frame of the second indicator image 52 by the adjustment of the measurer. Here, the slope detection unit 13 detects the slope of the face of the measurement subject (in the frame of the second indicator image 52) in the display image P202. In addition, the measurement unit 12 starts measurement of the biological information of the measurement subject.

The display image P203 indicates an image displayed by the display control unit 17 after the start of the measurement of the biological information. Here, the display control unit 17 displays the first indicator image 51 according to the slope of the face detected by the slope detection unit 13. That is, the display control unit 17 switches the second indicator image 52 to the first indicator image 51 described above. As illustrated in FIG. 2, when the measurement subject is in the seated state, the slope of the face of the measurement subject is along the vertical direction in the screen of the display unit 4. Therefore, the first indicator image 51 becomes a human-shaped contour guide of a bilaterally symmetrical human shape facing front with the shoulder portion immediately below the face position.

In addition, the display control unit 17 displays the notification information indicating that the biological information is being measured (a phrase "Now measuring") in the notification image 61. In addition, the display control unit 17 sequentially displays the measurement result in the result display field from an item of the biological information for which the measurement has been completed in the measurement result image 62. The display control unit 17 displays the display image P203 until the measurement of the biological information is completed. The measurer checks the display image P203 as described above and continues to photograph the image so as not to change the face position of the measurement subject until the measurement of the biological information is completed.

The display image P204 indicates an image displayed by the display control unit 17 when measurement of all items of the biological information to be measured is completed. At this time, the display control unit 17 ends the display of the first indicator image 51. In addition, the display control unit 17 displays the notification information indicating that the measurement of all the items of the biological information has been completed (a phrase "Measurement is completed") in the notification image 61. Further, the display control unit 17 displays the measurement result of the biological information that have been measured in the result display field in the measurement result image 62. The measurer confirms the display image P204 as described above and recognizes that the measurement of the biological information has been completed.

As described above, the display control unit 17 is able to make the measurer aware that photographing is first started such that the face of the measurement subject is enclosed within the frame of the second indicator image 52, and then continued so that the face position matches the first indicator image 51 without being displaced. As a result, even when the measurer is unfamiliar with a device such as a smartphone, it is possible to relatively easily photograph an image necessary for measuring biological information by using the terminal device 100.

In addition, since the display control unit 17 sequentially displays the measurement result from the biological information in which the measurement is completed in the measurement result image 62, the measurer can confirm that the measurement is progressing. As a result, it is possible to make the measurer feel that the measurement time is short and reduce the stress that the measurer waits until the measurement is completed, as compared with the case where the measurement result is displayed at the time when the measurement of all biological information is completed.

In addition, the display control unit 17 may display only biological information that can be measured by the measurement unit 12 from the photographed image among predetermined biological information (biological information to be measured) in the measurement result image 62. For example, the measurement of the respiratory rate requires that the shoulder of the measurement subject appear in the photographed image. In a case where the shoulder of the measurement subject is not shown in the photographed image, the measurement unit 12 does not measure the respiratory rate even when the respiratory rate is included in the predetermined biological information.

In such a case, the situation specification unit 16 specifies the respiratory rate as unmeasurable biological information in the predetermined biological information. The display control unit 17 displays a list of biological information excluding the unmeasurable biological information in the measurement result image 62. As a result, it is possible to prevent the measurer from being confused due to the presence of biological information (item of biological information) in which the measurement result is not displayed even when the measurement is completed. In addition, by reducing the number of items displayed in the list of the biological information, an effect of making the measurer feel that the measurement time is short can also be expected.

FIG. 3 is a view showing an example of an image displayed by the terminal device 100 at the time of measurement of a measurement subject in a lying state. FIG. 3 shows an example of display images P301 to P304 displayed by the display control unit 17 in order to make the measurer aware that the measurement subject in the lying state is appropriately photographed.

Similarly to display images P201, P202, and P204 in FIG. 2, the display control unit 17 displays the display images P301, P302, and P304, respectively.

Further, in the display image P303, the display control unit 17 displays the first indicator image 51 corresponding to the measurement subject in the lying state. That is, as shown in FIG. 3, when the measurement subject in the lying state is located on the right side of the measurement subject and photographed from obliquely above, the slope of the face of the measurement subject is inclined to the left with respect to the vertical direction in the screen of the display unit 4.

The slope detection unit 13 detects such a slope of the face of the measurement subject. Therefore, the first indicator image 51 becomes a diagonally inclined human-shaped contour guide facing diagonally upward to the right with the shoulder portion located at the lower right of the face position and the left shoulder located above the right shoulder.

In this manner, the display control unit 17 displays the first indicator image 51 for the measurer to continuously perform photographing so as not to change the face position of the measurement subject in accordance with the slope of the photographed face of the measurement subject. That is, when the face of the measurement subject in the lying state is photographed obliquely with respect to the screen, it is detected that the slope of the face is inclined, and the first indicator image 51 in which the slope of the face is inclined obliquely is displayed. As a result, it is possible to make the measurer intuitively feel that it is not necessary to rotate the terminal device 100 in accordance with the slope of the face of the measurement subject in the lying state, and that it is not necessary to photograph the image of the terminal device 100 toward the front of the face of the measurement subject, and that there is no problem by continuing to photograph the image as it is.

In addition, by using a human-shaped contour guide including the face portion and the shoulder portion as the first indicator image 51, it is possible to make the measurer aware that the line of the face portion and the shoulder of the image photographed is to be matched with the line of the human-shaped contour guide displayed near each of the face portion and the shoulder, and the face position of the measurement subject may not be removed, and the terminal device may not be moved. As a result, it is possible to easily perform photographing without removing (shifting) the face position.

In addition, by displaying the second indicator image 52 before starting the measurement, the measurer can start photographing the face position of the measurement subject in the display image without hesitation. Then, after the start of the measurement, the human-shaped contour guide of a human shape including the shoulder portion is displayed as the first indicator image 51, and it is possible to make the measurer aware that the face position of the measurement subject should not be removed or the terminal device should not be moved as described above. As a result, it is possible to easily perform photographing without removing (shifting) the face position.

Furthermore, depending on the performance of the photography unit 2, the distance between the measurement subject and the terminal device 100 may be restricted. Even in such a case, by displaying the frame-shaped guide as illustrated in FIGS. 2 and 3 as the second indicator image 52 and allowing the face of the measurement subject to be enclosed within the frame-shaped guide before starting the measurement, the distance between the measurement subject and the terminal device 100 can be easily adjusted within the restriction. Note that the measurement unit 12 may start the measurement after a certain period of time elapses in a state where a difference between the size of the frame-shaped guide and the size of the face is smaller than a threshold.

In addition, if a directional frame-shaped guide such as an ellipse or a rectangle is displayed as the frame-shaped guide, there is a concern that the measurer feels a burden or starts the measurement in an unreasonable posture, thinking that the face direction needs to be aligned along the direction of the frame-shaped guide. On the other hand, by using the frame-shaped guide having an isotropic shape, it is possible to make the measurer aware that it is only necessary to enclose the face within the frame-shaped guide.

The display image P304 indicates an image displayed by the display control unit 17 when measurement of all items of the biological information to be measured is completed. At this time, the display control unit 17 ends the display of the first indicator image 51. In addition, the display control unit 17 displays the notification information indicating that the measurement of all the items of the biological information has been completed (a phrase "Measurement is completed") in the notification image 61. Further, the display control unit 17 displays the measurement result of the biological information that have been measured in the result display field in the measurement result image 62. The measurer confirms the display image P304 as described above and recognizes that the measurement of the biological information has been completed.

Figure 4:
FIG. 4 is a view showing an example of an image displayed by the terminal device at the time of measurement of a measurement subject with its face turning sideways.
Figure 4:
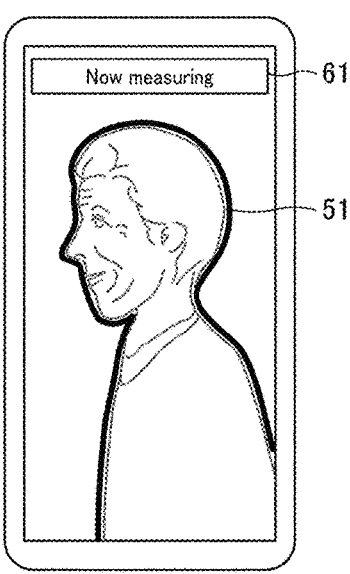

FIG. 4 is a view showing an image displayed by the terminal device 100 at the time of measurement of a measurement subject with its face turning sideways. FIG. 4 shows an example of a display image P401 displayed by the display control unit 17 when the orientation detection unit 14 determines that the face of the measurement subject turns sideways in the screen of the display unit 4 based on the face image.

In the display image P401, the display control unit 17 displays the first indicator image 51 for causing the measurer to continue photographing so as not to change the face position of the measurement subject whose face is turning sideways. Here, the human-shaped contour guide which is the first indicator image 51 includes lateral feature portions (for example, a shape of a sideways nose, and a sideways shoulder).

As a result, the measurer can be made aware that there is no problem while photographing the profile. Therefore, it is possible to avoid failure in the measurement by forcibly moving the terminal device 100 to photograph the front of the face.

Figure 5:
FIG. 5 is a view showing an example of an image displayed by the terminal device when a face position of the measurement subject in a screen of a display unit is displaced within a predetermined range.
Figure 5:
Figure 5:
Figure 5:
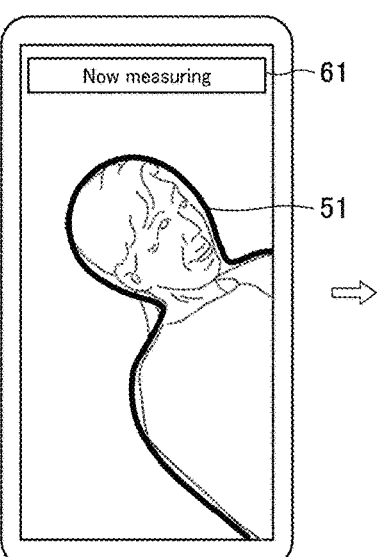
Figure 5:
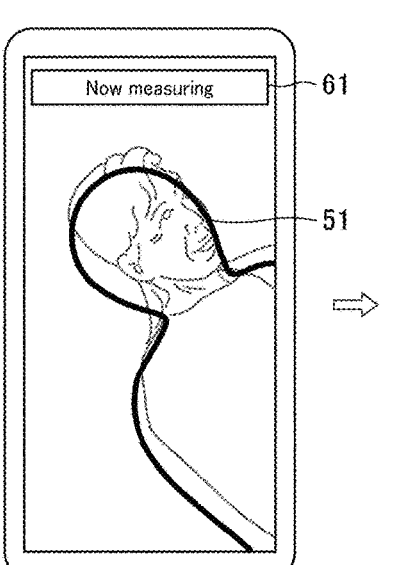
Figure 5:
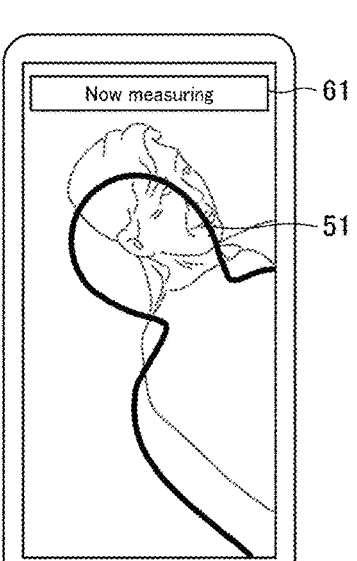

FIG. 5 is a view showing an example of an image displayed by the terminal device 100 when a face position of the measurement subject in a screen of the display unit 4 is displaced within a predetermined range. FIG. 5 shows an example of display images P501 to P503 in which the first indicator image 51 is displayed at a position at which the first indicator image 51 is displayed when there is no displacement in the face position without following the displacement in the face position of the measurement subject in the screen of the display unit 4. When the face position is displaced, the position of the shoulder is naturally displaced, but it is expressed as "displacement of the face position" in the following description.

The display image P501 indicates an image displayed by the display control unit 17 at the start of the measurement of the biological information. Here, the display control unit 17 displays the first indicator image 51 without displacement with respect to the face position of the measurement subject according to the slope of the face detected by the slope detection unit 13.

The display image P502 indicates a state in which the face position of the measurement subject is displaced from the face position of the measurement subject (illustrated in the display image P501) at the start of the measurement of the biological information, for example, due to camera shake of the measurer or the like. Here, the display control unit 17 displays the first indicator image 51 on top at the position at which the first indicator image 51 is displayed when there is no displacement in the face position so as not to follow the displacement in the face position. Therefore, the first indicator image 51 is held at the position at the start of measurement, and the first indicator image 51 is displaced with respect to the face position of the measurement subject in the display image P502.

The display image P503 indicates a state in which the face position of the measurement subject is further displaced with respect to the face position of the measurement subject at the start of measurement of the biological information than the display image P502. In the display image P503, the first indicator image 51 is further displaced with respect to the display image P502 with respect to the face position of the measurement subject.

In the configuration in which the first indicator image 51 follows the displacement of the face position, there is a concern that some measurers may be unaware of not changing the face position, that is, not moving the terminal device 100 to photograph an image. On the other hand, as illustrated in FIG. 5, by displaying the first indicator image 51 at the position at which the first indicator image 51 is displayed when there is no displacement in the face position, it is possible to make the measurer strongly aware of the displacement in the face position.

Figures 6, 7:
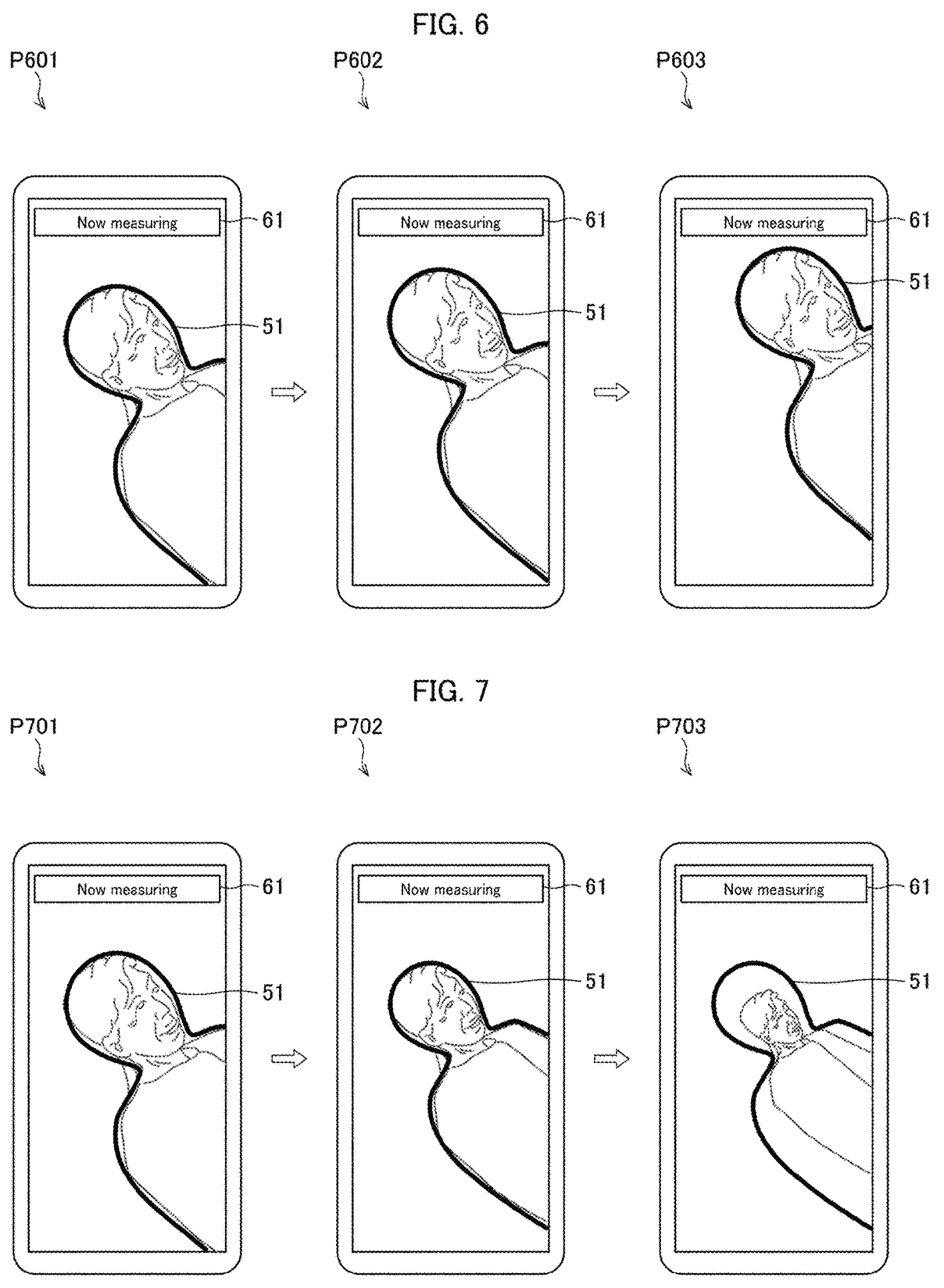

FIG. 6 is a view showing another example of the image displayed by the terminal device 100 when the face position of the measurement subject in the screen of the display unit 4 is displaced. FIG. 6 shows an example of display images P601 to P603 in which the first indicator image 51 follows the change due to the displacement of the face position of the measurement subject in the screen of the display unit 4. Note that the display of causing the first indicator image 51 to follow the change in the face position is performed only when the displacement in the face position is within a predetermined range. The predetermined range is, for example, a range in which the predetermined biological information of the measurement subject can be measured.

The display image P601 indicates an image displayed by the display control unit 17 at the start of the measurement of the biological information. Here, the display control unit 17 displays the first indicator image 51 without displacement with respect to the face position of the measurement subject according to the slope of the face detected by the slope detection unit 13.

The display image P602 indicates a state in which the face position of the measurement subject is displaced from the face position of the measurement subject (illustrated in the display image P601) at the start of the measurement of the biological information, for example, due to camera shake of the measurer or the like. The displacement of the face position of the measurement subject in the display image P602 is within a predetermined range. Here, in a case where the displacement of the face position is within the predetermined range, the display control unit 17 displays the first indicator image 51 on top of the display image following the change in the face position (change in the position of the face image). Therefore, in the display image P602, the first indicator image 51 is not displaced with respect to the face position of the measurement subject.

The display image P603 indicates a state in which the face position of the measurement subject is further displaced with respect to the face position of the measurement subject at the start of measurement of the biological information than the display image P602. The displacement of the face position of the measurement subject in the display image P603 is within a predetermined range. By displaying the first indicator image 51 following the change in the face image, the first indicator image 51 may not be displaced with respect to the measurement subject in the display image P603.

In the configuration in which the first indicator image 51 is displayed at the position displayed when there is no displacement in the face position, it is conceivable that some measurers move the terminal device largely due to a concern about the displacement in the face position, and cannot acquire the information necessary for measuring the biological information. For example, a continuous change is required to measure the pulse, but when the face image greatly changes, a continuous change cannot be acquired. In such a case, it is possible to reduce a measurement failure caused by moving the terminal device 100 by displaying following the change in the face position as described above. In addition, by performing display following the change in the face position, it is possible to reassure the measurer by making the measurer aware that there is no problem in photographing and measurement is in progress.

FIG. 7 is a view showing an image displayed by the terminal device 100 when the size of the face of the measurement subject in the screen of the display unit 4 becomes smaller than a predetermined threshold. FIG. 7 shows an example of display images P701 to P703 in which the size of the first indicator image 51 is set to a predetermined minimum size when the size of the face of the measurement subject in the screen of the display unit 4 is smaller than a predetermined threshold.

The display image P701 indicates an image displayed by the display control unit 17 at the start of the measurement of the biological information. Here, the display control unit 17 displays the first indicator image 51 according to the size of the face of the measurement subject detected by the size detection unit 15.

The display image P702 indicates a state in which the size of the face of the measurement subject is smaller than the size of the face of the measurement subject (indicated by display image P701) at the start of the measurement of the biological information. The size of the face of the measurement subject in the display image P702 is equal to or larger than a predetermined threshold. Here, in a case where the size of the face of the measurement subject is equal to or larger than the predetermined threshold, the display control unit 17 displays the size of the first indicator image 51 (human-shaped contour guide) so as to follow the size of the face of the measurement subject in the display image. Therefore, the first indicator image 51 follows the size of the face of the measurement subject from the display image P701 to the display image P702.

The display image P703 indicates a state in which the size of the face of the measurement subject is smaller than the size of the face of the measurement subject at the start of the measurement of the biological information than the display image P702. The size of the face of the measurement subject in the display image P703 is smaller than a predetermined threshold. Here, when the size of the face of the measurement subject is smaller than a predetermined threshold, the display control unit 17 displays the first indicator image 51 (human-shaped contour guide) with a predetermined minimum size. In the display image P703, the first indicator image 51 does not follow the size of the face of the measurement subject and maintains the predetermined minimum size.

If the distance between the terminal device 100 and the measurement subject is long and the size of the face of the measurement subject in the photographed image is small, there is a possibility that the measurement of the biological information fails. Therefore, it is necessary to prevent a decrease in the size of the face of the measurement subject in the photographed image. Therefore, when the size of the face of the measurement subject is smaller than a predetermined threshold, the display control unit 17 fixes the size of the first indicator image 51 to a predetermined minimum size, and displays the first indicator image 51 so as not to be smaller than the predetermined minimum size. As a result, it is possible to make the measurer aware that the size of the face of the measurement subject in the screen of the display unit 4 should not be smaller than the predetermined threshold (that is, the distance between the terminal device 100 and the measurement subject should be appropriately maintained).

Figure 8:
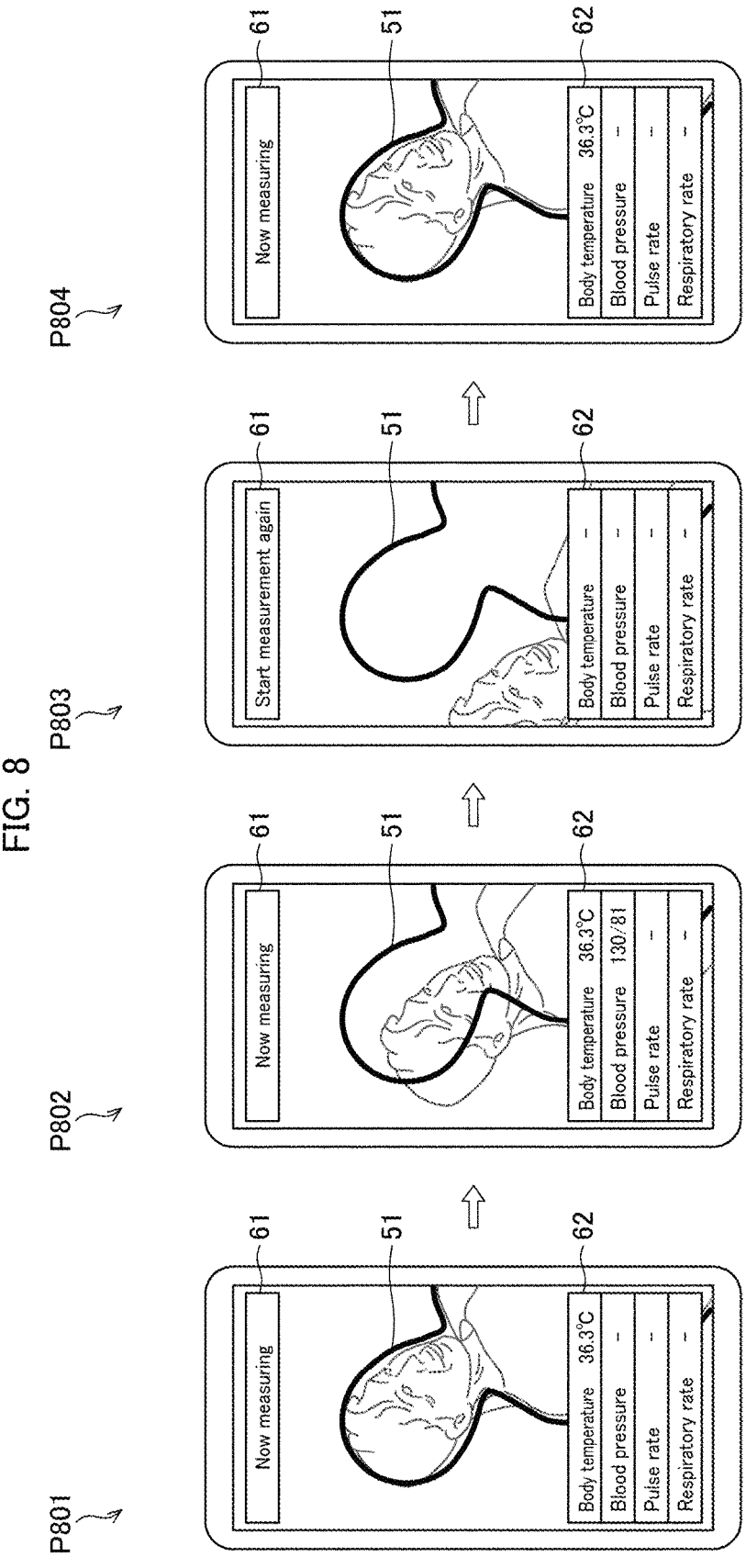
FIG. 8 is a view showing an example of an image displayed by the terminal device when a failure of measurement is specified by a situation specification unit.

FIG. 8 is a view showing an example of an image displayed by the terminal device 100 when a failure of measurement is specified by the situation specification unit 16. FIG. 8 shows an example of display images P801 to P804 indicating a state in which the display control unit 17 continues to display the first indicator image 51 when the situation specification unit 16 specifies a measurement failure.

The display image P801 is similar to the display image P501 shown in FIG. 5. At this time, the display control unit 17 displays the measurement result of the body temperature for which the measurement is completed in the measurement result image 62.

Similarly to the display image P502 shown in FIG. 5, the display image P802 indicates a state in which the first indicator image 51 is displayed at the position at which the first indicator image 51 is displayed when there is no displacement in the face position without following the displacement in the face position of the measurement subject. At this time point, the display control unit 17 displays the measurement results of the body temperature and the blood pressure for which the measurement is completed in the measurement result image 62.

The display image P803 indicates a state in which the face position of the measurement subject is displaced beyond a predetermined range. At this time, the situation specification unit 16 specifies a measurement failure of the measurement unit 12. Here, when the situation specification unit 16 specifies the measurement failure while the first indicator image 51 is being displayed, the display control unit 17 continues to display the first indicator image 51. That is, even when the face position of the measurement subject is displaced beyond the predetermined range and remeasurement is required, the first indicator image 51 is continuously displayed at the position at which the first indicator image 51 is displayed when there is no displacement in the face position.

In addition, when the situation specification unit 16 specifies the measurement failure, the display control unit 17 displays the notification information (a phrase "Measurement is performed again") indicating that the remeasurement is to be performed in the notification image 61. In addition, the display control unit 17 ends the display of the measurement results of the body temperature and the blood pressure in the measurement result image 62. The measurer checks the display image P803 as described above and operates the terminal device 100 to move the face of the measurement subject to the face portion of the first indicator image 51 that is continuously displayed.

The display image P804 indicates a state in which the face of the measurement subject returns to the face portion of the first indicator image 51 by the operation of the measurer. When the face of the measurement subject returns to the face portion of the first indicator image 51, the measurement unit 12 resumes the measurement of the biological information of the measurement subject.

As described above, by continuously displaying the first indicator image 51 even when the measurement fails, the measurer is urged to perform remeasurement, and the remeasurement can be quickly started. Some measurers become bewildered or confused when the display of the first indicator image 51 disappears. Continuously displaying the first indicator image 51 can make such a measurer promptly perform remeasurement.

FIG. 9 is a view showing another example of the image displayed by the terminal device 100 when a failure of measurement is specified by the situation specification unit 16. FIG. 9 shows an example of display images P901 to P904 in which the display of the first indicator image 51 is ended and the second indicator image 52 is displayed when the situation specification unit 16 specifies a measurement failure.

The display images P901 and P902 indicate states similar to those of the display images P801 and P802, respectively.

The display image P903 indicates a state in which the face position of the measurement subject is displaced beyond a predetermined range. At this time, the situation specification unit 16 specifies a measurement failure of the measurement unit 12. Here, when the situation specification unit 16 specifies the measurement failure while the first indicator image 51 is being displayed, the display control unit 17 ends the display of the first indicator image 51 and displays the second indicator image 52. That is, when the face position of the measurement subject is displaced beyond the predetermined range, the first indicator image 51 is switched to the second indicator image 52. The notification image 61 and the measurement result image 62 are displayed similarly to the display image P803. The measurer checks the display image P903 as described above and moves the terminal device 100 so as to move the face portion within the frame of the second indicator image 52 to be displayed again.

When the measurer moves the terminal device 100 to move the face of the measurement subject to the frame of the second indicator image 52, the slope detection unit 13 detects the slope of the face of the measurement subject (which has been moved within the frame of the second indicator image 52) in the display image P903, and the measurement unit 12 resumes the measurement of the biological information of the measurement subject.

The display image P904 indicates an image displayed by the display control unit 17 when the measurement of the biological information is resumed. Here, the display control unit 17 newly displays the first indicator image 51 according to the slope of the face detected by the slope detection unit 13.

As described above, when the measurement fails, the display returns to the second indicator image, and the measurer recognizes that the remeasurement is started. This allows the measurer to try to avoid failure of the next measurement.

Figure 10:
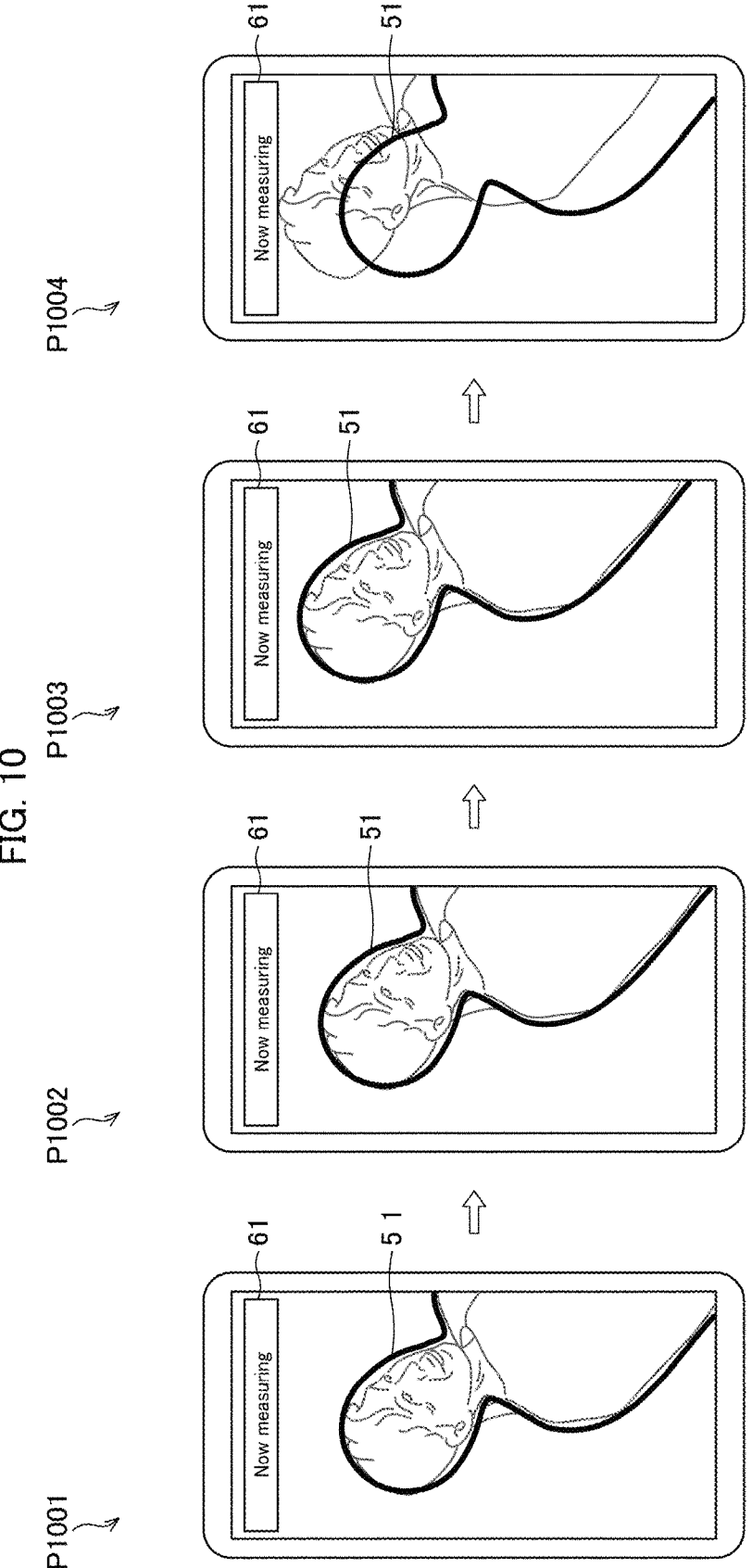
FIG. 10 is a view showing an example of the image displayed by the terminal device when the face position of the measurement subject in the screen of the display unit is displaced beyond a predetermined range.

FIG. 10 is a view showing an example of an image displayed by the terminal device 100 when a face position of the measurement subject in a screen of the display unit 4 is displaced beyond a predetermined range. FIG. 10 shows an example of display images P1001 to P1004 in which the first indicator image following the change of the face image is displayed so as to quickly return to an original position at the start of the measurement when the face image is displaced beyond the predetermined range. The display image P1001 indicates a state similar to that of the display image P601.

The display image P1002 indicates a state in which the face position of the measurement subject is displaced from the face position of the measurement subject (illustrated in the display image P1001) at the start of the measurement of the biological information. Here, the displacement of the face position of the measurement subject in the display image P1002 is within a predetermined range. When the displacement of the face position is within the predetermined range, the display control unit 17 displays the first indicator image 51 on top of the display image following the change in the face position. Therefore, in the display image P1002, the first indicator image 51 is not displaced with respect to the face position of the measurement subject.

The display image P1003 indicates a state in which the face position of the measurement subject is further displaced with respect to the face position of the measurement subject at the start of measurement of the biological information than the display image P1002. Here, the displacement of the face position of the measurement subject in the display image P1003 is within a predetermined range. In the display image P1003, the first indicator image 51 is not displaced with respect to the face position of the measurement subject.

The display image P1004 indicates a state in which the face position of the measurement subject is displaced beyond a predetermined range with respect to the face position of the measurement subject at the start of measurement of the biological information. When the displacement of the face position exceeds the predetermined range, the display control unit 17 displays the first indicator image 51 at the position at which the first indicator image 51 is displayed when there is no displacement (in the direction of the first indicator image 51 displayed at the start of the measurement of the biological information) at a speed faster than the change of the face position. In the example illustrated in FIG. 10, since the face position is displaced upward, the display control unit 17 represents the movement of the first indicator image in which the first indicator image quickly moves downward.

When a displacement amount of the face position exceeds the predetermined range, the display control unit 17 displays the first indicator image 51 with a movement to return at a high speed to the position at which the first indicator image 51 is displayed when there is no displacement. That is, the terminal device 100 causes the first indicator image 51 not only to follow but also to change at a higher speed than the change in the face position to make a motion like jumping. This allows the measurer to strongly recognize that the face position is displaced.

3. Operation Example

Figure 11:
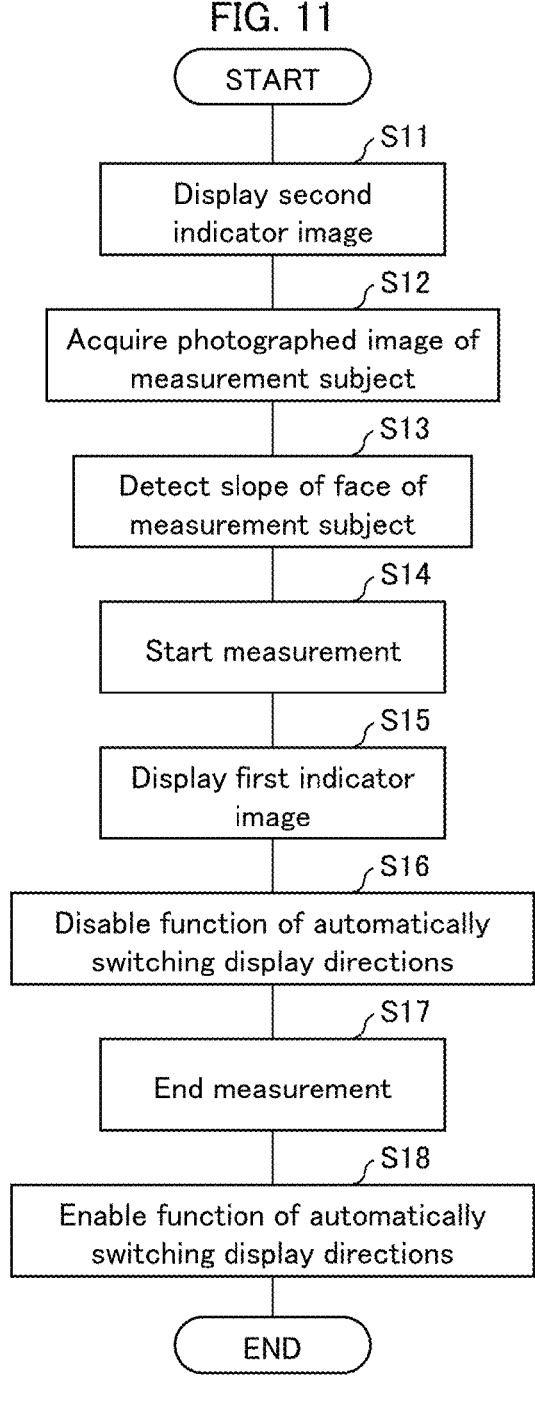
FIG. 11 is a flowchart showing an example of an operation example of the terminal device.

FIG. 11 is a flowchart showing an example of an operation of the terminal device 100. An operation example for the terminal device 100 to appropriately measure the biological information of the measurement subject will be described below with reference to FIG. 11.

First, for example, the photography unit 2 starts photographing with an input operation of the measurer via the input unit 3 as a trigger. When shooting is started, the display control unit 17 displays the second indicator image 52 at a predetermined position in the screen of the display unit 4 (S11). Next, when the measurer adjusts a photographing region and the face of the measurement subject is enclosed within the frame of the second indicator image 52, the information acquisition unit 11 starts acquisition of a photographed image of the measurement subject as information for measuring biological information of the measurement subject (S12). Next, the slope detection unit 13 detects the slope of the face of the measurement subject in the screen of the display unit 4 based on the face image of the measurement subject included in the photographed image (S13). Next, the measurement unit 12 starts measurement of the biological information of the measurement subject based on the photographed image (S14).

Next, the display control unit 17 displays the first indicator image 51 according to the slope of the face detected by the slope detection unit 13 on top of the display image (S15). When the first indicator image 51 is displayed, the display control unit 17 disables a function of automatically switching vertical and horizontal display directions of the display image with respect to the screen of the display unit 4 (S16). During the measurement by the measurement unit 12, when the face position of the measurement subject is not displaced beyond the predetermined range in the screen of the display unit 4, the measurement unit 12 ends the measurement of the biological information of the measurement subject (S17). At this time, the display control unit 17 changes a display mode of the screen of the display unit 4 so that the measurer can be aware that the measurement has ended (see FIG. 12). When the face position of the measurement subject is displaced beyond the predetermined range in the screen of the display unit 4 during the measurement by the measurement unit 12, the process returns to S11 (corresponding to the pattern in FIG. 9) or S15 (corresponding to the pattern in FIG. 8). When the measurement has ended, the information acquisition unit 11 ends the acquisition of the photographed image as information.

Next, the display control unit 17 ends the display of the first indicator image 51, and enables the function of automatically switching the vertical and horizontal display directions of the display image with respect to the screen of the display unit 4 (S18).

As described above, the display control unit 17 disables the function of automatically switching the vertical and horizontal display directions of the display image with respect to the screen of the display unit 4 while the first indicator image 51 is displayed. When the function of automatically switching the display direction acts due to the slope of the terminal device 100 during photographing and the display direction is switched, the terminal device 100 may be moved in an impatient manner and measurement may fail. By disabling the function of automatic switching while the first indicator image 51 is displayed, it is possible to reduce the measurement failure caused by moving the terminal device 100. The display control unit 17 may disable the function of automatic switching at a time point before S11.

4. Display Example at End of Measurement

FIG. 12 is a view showing an image displayed by the terminal device 100 on the basis of completion of measurement of biological information of the measurement subject. The situation specification unit 16 specifies that the measurement unit 12 has finished measuring the biological information of the measurement subject. The display control unit 17 changes the display mode of the screen of the display unit 4 on the basis of the specification by the situation specification unit 16 so that the measurer can be aware that the measurement is finished.

FIG. 12 shows an example of display images P1201 and P1202 that display the screen of the display unit 4 from an anterior when the measurement of the biological information of the measurement subject is completed. The display image P1201 indicates a state similar to that of the display image P303.

The display image P1202 indicates an image displayed by the display control unit 17 after the measurement of the biological information of the measurement subject is completed. Here, based on the specification by the situation specification unit 16, the display control unit 17 displays the screen of the display unit 4 from an anterior so that the measurer can be aware that the measurement is finished. That is, the display control unit 17 rotates and displays the display image such that the slope of the face is along the vertical direction in the screen of the display unit 4. Furthermore, the display control unit 17 may display a process in which the display image rotates at this time. As a result, the terminal device 100 can cause the measurer to be intuitively aware that the imaging for the measurement subject may be ended.

Note that the display control unit 17 may end the display of the first indicator image 51 so that the measurer can be aware that the measurement has ended. In addition, the display control unit 17 may display the biological information for which the measurement has been completed in a large size, regardless of whether or not the screen of the display unit 4 is displayed from an anterior, including the cases illustrated in the other display examples.

Further, the display control unit 17 may switch the display mode of the screen of the display unit 4 from a movie to a still image after the measurement is completed when a movie has been displayed during measurement, regardless of whether or not the screen of the display unit 4 is displayed from an anterior, including the cases illustrated in the other display examples.

FIG. 13 is a diagram illustrating a state in which the second indicator image 52 gradually changes to the first indicator image 51. As illustrated in FIG. 13, when switching the second indicator image 52 to the first indicator image 51, the display control unit 17 may gradually change from the second indicator image 52 (a figure m1) that is a circular frame-shaped guide to the first indicator image 51 (a figure m8) that is a human-shaped contour guide. Then, a portion of the human-shaped contour guide having a size corresponding to the photographed image may be displayed in the screen of the display unit 4.

In this manner, by changing the second indicator image 52 to the first indicator image 51 seamlessly according to the slope of the face of the measurement subject, the measurer can recognize that the image can be appropriately photographed in the current state.

As described above, according to the terminal device 100 of the present embodiment, it is possible to contribute to Goal 3 of the Sustainable Development Goals (SDGs) "Good Health and Well-Being". This can contribute to the achievement of the Sustainable Development Goals (SDGs).

Implementation Example by Software

The functions of the terminal device 100 (hereinafter, referred to as "device") can be realized by a program for causing a computer to function as the device, which program is for causing the computer to function as control blocks of the device (in particular, the units included in the control unit 1).

In this case, the device includes a computer having at least one control device (for example, a processor) and at least one storage device (for example, a memory) as hardware for executing the program. By executing the program by the control device and the storage device, the functions described in the above embodiment are realized.

The program may be recorded not temporarily but in one or a plurality of computer-readable recording media. The recording media may or may not be included in the device. In the latter case, the program may be supplied to the device via any wired or wireless transmission medium.

In addition, some or all of the functions of the control blocks can be realized by a logic circuit. For example, an integrated circuit in which a logic circuit functioning as each control block is provided is also included in the scope of the present invention. In addition, for example, the functions of the control blocks can be realized by a quantum computer.

The processing described in the above embodiment may be executed by an artificial intelligence (AI). In this case, the AI may operate in the control device, or may operate in another device (for example, an edge computer, a cloud server, or the like).

SUMMARY

A terminal device according to a first aspect of the present invention includes: a photography unit; a display unit; an information acquisition unit configured to acquire an image of a measurement subject photographed by the photography unit as information for measuring biological information of the measurement subject; a slope detection unit configured to detect a slope of a face of the measurement subject in a screen of the display unit based on a face image of the measurement subject included in the image photographed by the photography unit; and a display control unit configured to cause a first indicator image to be displayed on top of the image including the measurement subject displayed in the screen of the display unit, the first indicator image corresponding to the slope of the face detected by the slope detection unit.

In the conventional configuration in which a face position guide for aligning the face position of the measurement subject is fixed, the measurer needs to rotate the terminal device in accordance with the face position guide, and there is a concern that the measurer feels troublesome when the measurement subject is in a lying state.

According to the above configuration, the display control unit displays the first indicator image in accordance with the slope of the photographed face of the measurement subject. That is, when the face of the measurement subject in the lying state is photographed obliquely with respect to the screen, it is detected that the slope of the face is inclined, and the first indicator image in which the slope of the face is inclined obliquely is displayed. Therefore, the measurer starts photographing so that the face of the measurement subject is shown within the screen for the time being, and then continues photographing so that the face position is not displaced in accordance with the first indicator image that is displayed on top of the measurement subject. Thus, it is possible to photograph an image necessary for measurement of the biological information.

In the first aspect, the first indicator image according to a second aspect of the present invention may be a human-shaped contour guide of a human shape including a face portion and a shoulder portion.

According to the above configuration, it is possible to make the measurer aware that the face position of the measurement subject may not be removed, and the terminal device may not be moved. As a result, it is possible to easily perform photographing without removing (shifting) the face position.

In the first aspect, the display control unit according to a third aspect of the present invention may display, before starting measurement, a second indicator image on top of the image, the second indicator image being an indicator by which a measurer adjusts a face position of the measurement subject with a predetermined position in the screen, and display, after starting measurement, the first indicator image on top of the image, the first indicator image being a human-shaped contour guide of a human shape including a face portion and a shoulder portion.

According to the above configuration, by displaying the second indicator image before starting the measurement, the measurer can start photographing the face position of the measurement subject in the photographed image without hesitation. Then, after the start of the measurement, the human-shaped contour guide of a human shape including the shoulder portion is displayed as the first indicator image, and it is possible to make the measurer aware that the face position of the measurement subject should not be removed or the terminal device should not be moved. As a result, it is possible to easily perform photographing without removing (shifting) the face position.

In the third aspect, the second indicator image according to a fourth aspect of the present invention may be a frame-shaped guide that encloses the face of the measurement subject displayed in the screen within the frame-shaped guide.

Depending on the performance of the photography unit, the distance between the measurement subject and the terminal device may be restricted. Even in such a case, by displaying the frame-shaped guide as the second indicator image and allowing the face of the measurement subject to be enclosed within the frame-shaped guide before starting the measurement, the distance between the measurement subject and the terminal device can be easily adjusted within the restriction.

In the fourth aspect, the frame-shaped guide according to a fifth aspect of the present invention may have an isotropic shape.

If a directional frame-shaped guide such as an ellipse or a rectangle is displayed as the frame-shaped guide, there is a concern that the measurer feels a burden thinking that the face direction needs to be aligned along the direction of the frame-shaped guide.

By using the frame-shaped guide having an isotropic shape, it is possible to make the measurer aware that it is only necessary to enclose the face within the frame-shaped guide.

In the fifth aspect, the isotropic shape according to the sixth aspect of the present invention may be one of a circle, a regular polygon, and a sphere.

In the first to sixth aspects, the display control unit according to a seventh aspect of the present invention may display the first indicator image on top of the image at a position to be displayed when there is no displacement in the face position of the measurement subject.

In the configuration in which the first indicator image follows the displacement of the face position, there is a concern that some measurers may be unaware of not changing the face position, that is, not moving the terminal device to photograph an image. By displaying the first indicator image at the position to be displayed when there is no displacement in the face position, it is possible to make the measurer strongly aware of the displacement in the face position.

In the first to sixth aspects, the display control unit according to an eighth aspect of the present invention may display the first indicator image on top of the image following a change in the face position when the displacement in the face position of the measurement subject is within a predetermined range.

In the configuration in which the first indicator image is displayed at the position displayed when there is no displacement in the face position, it is conceivable that some measurers move the terminal device largely due to a concern about the displacement in the face position, and cannot acquire the information (for example, a continuous change required for measuring the pulse) necessary for measuring the biological information (measurement fails). On the other hand, it is possible to reduce the measurement failure caused by moving the terminal device by displaying following the change in the face position as described above. In addition, by performing display following the change in the face position, it is possible to reassure the measurer by making the measurer aware that there is no problem in photographing and measurement is in progress.

In the first to eighth aspects, the display control unit according to a ninth aspect of the present invention may disable a function of automatically switching vertical and horizontal display directions of an image with respect to the screen while the first indicator image is displayed.

When the function of automatically switching the display direction acts due to the slope of the terminal device during photographing and the display direction is switched, the terminal device may be moved in an impatient manner and measurement may fail. By disabling the function of automatic switching while the first indicator image is displayed, it is possible to reduce the measurement failure caused by moving the terminal device.

In the above second or third aspect, the terminal device according to a tenth aspect of the present invention may further include an orientation detection unit configured to detect whether the face of the measurement subject turns sideways based on the face image of the measurement subject included in the image photographed by the photography unit, wherein when the face of the measurement subject turns sideways, the human-shaped contour guide of the human shape as the first indicator image includes a sideways feature portion.

According to the above configuration, in a case where the face of the measurement subject is directed sideways, the human-shaped contour guide that is the first indicator image includes a sideways feature, for example, a shape of a sideways nose and a sideways shoulder. Therefore, the measurer can be made aware that there is no problem while photographing the sideways face. As a result, it is possible to avoid failure in the measurement by forcibly moving the terminal device to photograph the front of the face.

In the above second or third aspect, the terminal device according to an eleventh aspect of the present invention may further include a size detection unit configured to detect a size of the face of the measurement subject in the screen of the display unit based on the face image of the measurement subject included in the image photographed by the photography unit, wherein the display control unit displays, when the size of the face of the measurement subject is equal to or larger than a predetermined threshold, the human-shaped contour guide such that a size of the human-shaped contour guide follows the size of the face of the measurement subject in the image, and displays, when the size of the face of the measurement subject is smaller than the predetermined threshold, the human-shaped contour guide in a predetermined minimum size.

If the distance between the terminal device and the measurement subject is long and the size of the face of the measurement subject in the photographed image is small, there is a possibility that the measurement of the biological information fails. Therefore, it is necessary to prevent a decrease in the size of the face of the measurement subject in the photographed image.

Therefore, when the size of the face of the measurement subject is smaller than a predetermined threshold, the display control unit fixes the size of the first indicator image to a predetermined minimum size, and displays the first indicator image so as not to be smaller than the predetermined minimum size. As a result, it is possible to make the measurer aware that the size of the face of the measurement subject in the screen of the display unit should not be smaller than the predetermined threshold (that is, the distance between the terminal device and the measurement subject should be appropriately maintained).

In the first to eleventh aspects, the terminal device according to a twelfth aspect of the present invention may further include a situation specification unit configured to specify a situation related to measurement, wherein the display control unit continues to display the first indicator image when the situation specification unit specifies a measurement failure while the first indicator image is displayed.

According to the above configuration, even when the measurement fails, the remeasurement can be quickly started by displaying the first indicator image and causing the measurer to continue photographing.

In the third to sixth aspects, the terminal device according to a thirteenth aspect of the present invention may include a situation specification unit configured to specify a situation related to measurement, wherein the display control unit stops displaying the first indicator image and displays the second indicator image when the situation specification unit specifies a measurement failure while the first indicator image is displayed.

According to the above configuration, when the measurement fails, the display returns to the second indicator image, and the measurer recognizes that the remeasurement is started. This allows the measurer to try to avoid failure of the next measurement.

The terminal device according to each aspect of the present invention may be implemented by a computer. In this case, a control program for the terminal device that causes a computer to implement the terminal device by operating the computer as each unit (software element) provided for the terminal device, and a computer-readable recording medium that stores the control program are also included in the scope of the present invention.

The present invention is not limited to the above-described embodiments, and various modifications can be made within the scope indicated in the claims, and embodiments obtained by appropriately combining the technical means disclosed in the different embodiments are also included in the technical scope of the present invention. Further, new technical features can be provided by combining the technical means disclosed in each embodiment.

| Reference Signs List | |
| --- | --- |
| 1 | Control unit |
| 2 | Photography unit |
| 4 | Display unit |
| 11 | Information acquisition unit |
| 13 | Slope detection unit |

-continued

| Reference Signs List | |
| --- | --- |
| 14 | Orientation detection unit |
| 15 | Size detection unit |
| 16 | Situation specification unit |
| 17 | Display control unit |
| 51 | First indicator image |
| 52 | Second indicator image |
| 100 | Terminal device |

The invention claimed is:

1. A terminal device comprising:
a photography unit;
a display unit;
an information acquisition unit configured to acquire an image of a measurement subject photographed by the photography unit as information for measuring biological information of the measurement subject;
a slope detection unit configured to detect a slope of a face of the measurement subject in a screen of the display unit based on a face image of the measurement subject included in the image photographed by the photography unit; and
a display control unit configured to cause a first indicator image to be displayed on top of the image including the measurement subject displayed in the screen of the display unit, the first indicator image corresponding to the slope of the face detected by the slope detection unit.

2. The terminal device according to claim 1, wherein the first indicator image is a human-shaped contour guide of a human shape including a face portion and a shoulder portion.

3. The terminal device according to claim 1, wherein the display control unit
displays, before starting measurement, a second indicator image on top of the image, the second indicator image being an indicator by which a measurer adjusts a face position of the measurement subject with a predetermined position in the screen, and
displays, after starting measurement, the first indicator image on top of the image, the first indicator image being a human-shaped contour guide of a human shape including a face portion and a shoulder portion.

4. The terminal device according to claim 3, wherein the second indicator image is a frame-shaped guide that encloses the face of the measurement subject displayed in the screen within the frame-shaped guide.

5. The terminal device according to claim 4, wherein the frame-shaped guide has an isotropic shape.

6. The terminal device according to claim 5, wherein the isotropic shape is one of a circle, a regular polygon, and a sphere.

7. The terminal device according to claim 1, wherein the display control unit displays the first indicator image on top of the image at a position to be displayed when there is no displacement in the face position of the measurement subject.

8. The terminal device according to claim 1, wherein when the displacement in the face position of the measurement subject is within a predetermined range, the display control unit displays the first indicator image on top of the image following a change in the face position.

9. The terminal device according to claim 1, wherein while the first indicator image is displayed, the display control unit disables a function of automatically switching vertical and horizontal display directions of an image with respect to the screen.

10. The terminal device according to claim 2, further comprising
an orientation detection unit configured to detect whether the face of the measurement subject turns sideways based on the face image of the measurement subject included in the image photographed by the photography unit, wherein
when the face of the measurement subject turns sideways, the human-shaped contour guide as the first indicator image includes a sideways feature portion.

11. The terminal device according to claim 2, further comprising
a size detection unit configured to detect a size of the face of the measurement subject in the screen of the display unit based on the face image of the measurement subject included in the image photographed by the photography unit, wherein
the display control unit
displays, when the size of the face of the measurement subject is equal to or larger than a predetermined threshold, the human-shaped contour guide such that a size of the human-shaped contour guide follows the size of the face of the measurement subject in the image, and
displays, when the size of the face of the measurement subject is smaller than the predetermined threshold, the human-shaped contour guide in a predetermined minimum size.

12. The terminal device according to claim 1, further comprising
a situation specification unit configured to specify a situation related to measurement, wherein
the display control unit continues to display the first indicator image when the situation specification unit specifies a measurement failure while the first indicator image is displayed.

13. The terminal device according to claim 3, further comprising
a situation specification unit configured to specify a situation related to measurement, wherein
the display control unit stops displaying the first indicator image and displays the second indicator image when the situation specification unit specifies a measurement failure while the first indicator image is displayed.

14. A non-transitory computer-readable medium coupled to at least one processor and storing one or more computer-executable instructions that, when executed by the at least one processor, cause the at least one processor to function as the terminal device, the information acquisition unit, the slope detection unit, and the display control unit according to claim 1.

* * * * *